United States Patent
Bae et al.

(10) Patent No.: US 11,122,633 B2
(45) Date of Patent: Sep. 14, 2021

(54) APPARATUS AND METHOD FOR CONTROLLING UPLINK TRANSMISSION TIMING IN INTERNET OF THINGS ENVIRONMENT

(71) Applicant: Samsung Electronics Co., Ltd., Gyeonggi-do (KR)

(72) Inventors: Yun Gyu Bae, Gyeonggi-do (KR); Ki Cheol Nam, Gyeonggi-do (KR); Ki Sung Park, Gyeonggi-do (KR); Han Sung Leem, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 16/123,246

(22) Filed: Sep. 6, 2018

(65) Prior Publication Data

US 2019/0075605 A1    Mar. 7, 2019

(30) Foreign Application Priority Data

Sep. 6, 2017  (KR) .......................... 10-2017-0113623

(51) Int. Cl.
*H04W 76/10* (2018.01)
*H04W 74/08* (2009.01)
(Continued)

(52) U.S. Cl.
CPC ....... *H04W 76/10* (2018.02); *H04W 56/0005* (2013.01); *H04W 56/0015* (2013.01);
(Continued)

(58) Field of Classification Search
None
See application file for complete search history.

(56) References Cited

U.S. PATENT DOCUMENTS 8,824,310 B2   9/2014 Jeong et al.
8,964,793 B2   2/2015 Jang et al.
(Continued)

FOREIGN PATENT DOCUMENTS

WO   2016/019895 A1   2/2016

OTHER PUBLICATIONS

UE Procedures related to narrowband IoT; 3rd Generation Partnership Project (3GPP); Mar. 4, 2017; XP051236982.
European Search Report dated Jan. 24, 2019.

Primary Examiner — Saad Khawar
(74) Attorney, Agent, or Firm — Cha & Reiter, LLC

(57) ABSTRACT

An electronic device is disclosed. The electronic device supporting a low power wide area network (LPWAN) includes a communication circuit to make communication with a base station, a processor electrically connected with the communication circuit, and a memory electrically connected with the processor. The memory may include instructions that, when executed, cause the processor to establish a radio link with the base station by using the communication circuit, to transmit, to the base station, a first message requesting a random access by using the communication circuit, to receive a second message replying to the first message from the base station by using the communication circuit, when a timer is running for uplink transmission timing, and to update an existing timing advance value for the uplink transmission timing, based on a timing advance value included in the second message.

16 Claims, 9 Drawing Sheets

(51) Int. Cl.
    *H04W 56/00*    (2009.01)
    *H04W 88/08*    (2009.01)
    *H04W 4/80*     (2018.01)

(52) U.S. Cl.
    CPC .......... *H04W 74/0833* (2013.01); *H04W 4/80* (2018.02); *H04W 88/08* (2013.01)

(56) References Cited

U.S. PATENT DOCUMENTS

| | | | |
|---|---|---|---|
| 9,210,673 B2 | 12/2015 | Li et al. | |
| 9,210,677 B2 | 12/2015 | Jang et al. | |
| 9,288,801 B2 | 3/2016 | Jeong et al. | |
| 9,380,632 B2 | 6/2016 | Jeong et al. | |
| 9,398,632 B2 | 7/2016 | Jeong et al. | |
| 9,491,782 B2 | 11/2016 | Kim et al. | |
| 9,491,783 B2 | 11/2016 | Kim et al. | |
| 9,565,711 B2 | 2/2017 | Jang et al. | |
| 9,585,188 B2 | 2/2017 | Jang et al. | |
| 9,635,700 B2 | 4/2017 | Jeong et al. | |
| 10,070,434 B2 | 9/2018 | Ho et al. | |
| 10,098,106 B2 | 10/2018 | Kim et al. | |
| 2009/0232107 A1* | 9/2009 | Park | H04W 72/0413 370/336 |
| 2010/0177747 A1* | 7/2010 | Chun | H04W 72/0446 370/336 |
| 2012/0257510 A1 | 10/2012 | Jeong et al. | |
| 2012/0257559 A1 | 10/2012 | Kim et al. | |
| 2012/0257569 A1 | 10/2012 | Jang et al. | |
| 2012/0257570 A1 | 10/2012 | Jang et al. | |
| 2012/0257601 A1 | 10/2012 | Kim et al. | |
| 2013/0195084 A1* | 8/2013 | Chen | H04L 5/0048 370/336 |
| 2014/0016559 A1 | 1/2014 | Jang et al. | |
| 2014/0023030 A1 | 1/2014 | Jeong et al. | |
| 2014/0064195 A1 | 3/2014 | Li et al. | |
| 2014/0126520 A1* | 5/2014 | Quan | H04W 74/0866 370/329 |
| 2014/0341011 A1 | 11/2014 | Jeong et al. | |
| 2015/0131635 A1 | 5/2015 | Jang et al. | |
| 2015/0134837 A1 | 5/2015 | Jeong et al. | |
| 2015/0134838 A1 | 5/2015 | Jeong et al. | |
| 2015/0271796 A1 | 9/2015 | Jang et al. | |
| 2015/0351134 A1 | 12/2015 | Kim et al. | |
| 2015/0365790 A1* | 12/2015 | Edge | H04W 4/90 455/404.2 |
| 2016/0198496 A1 | 7/2016 | Jeong et al. | |
| 2016/0242132 A1* | 8/2016 | Bae | H04W 56/0045 |
| 2017/0048835 A1 | 2/2017 | Kim et al. | |
| 2017/0142708 A1 | 5/2017 | Ho et al. | |
| 2017/0164312 A1 | 6/2017 | Jang et al. | |
| 2017/0201958 A1 | 7/2017 | He | |
| 2017/0208581 A1 | 7/2017 | Yang et al. | |
| 2017/0223746 A1 | 8/2017 | Jeong et al. | |
| 2018/0338303 A1* | 11/2018 | Jia | H04L 67/12 |

\* cited by examiner

APPARATUS AND METHOD FOR CONTROLLING UPLINK TRANSMISSION TIMING IN INTERNET OF THINGS ENVIRONMENT

CROSS-REFERENCE TO RELATED APPLICATION(S)

This application is based on and claims priority under 35 U.S.C. § 119 to Korean Patent Application No. 10-2017-0113623, filed on Sep. 6, 2017, in the Korean Intellectual Property Office, the disclosure of which is incorporated by reference herein its entirety.

BACKGROUND

1. Field

The present disclosure generally relates to an apparatus and a method for controlling uplink transmission timing under an Internet of Things (IoT) environment.

2. Description of Related Art

The Internet is evolving from a human-oriented connection network in which humans generate and consume information, to an IoT network in which distributed components, such as devices or things, exchange and process information. In the IoT network, intelligent Internet technology (IT) services may be provided to collect and analyze data generated from things and provide the results of the analyses to users for user convenience. IoT networks may be deployed in environments such as smart homes, smart buildings, smart cities, smart cars or connected cars, smart grids, healthcare, smart home appliances, advanced medical centers, etc. The IoT network may be implemented as a low-power wide-area network (LPWAN).

In a wireless network environment, an electronic device has to schedule transmission of uplink data with a base station using a timing advance value and a timer value. The timing advance value is a value that is used to adjust timing of the transmission of uplink data from the electronic device to the base station. The base station may control the uplink transmission timing of the electronic device by allocating a timing advance value to the electronic device. The timer value is a value used to control a period in which the electronic device performs uplink timing alignment (or timing advance) with a specific base station. The electronic device may apply the timing advance value received from the base station without change, or ignore the timing advance value, depending on various conditions.

The above information is presented as background information only to assist with an understanding of the present disclosure. No determination has been made, and no assertion is made, as to whether any of the above might be applicable as prior art with regard to the present disclosure.

SUMMARY

In the case of a cellular network having limited frequency bandwidth however, application of the timing advance value received from the base station by the electronic device (e.g., an electronic device supporting the IoT) may be limited. For example, due to the limited frequency bandwidth, the electronic device may fail to update the timing advance value such that it may not smoothly transmit or receive a signal between the electronic device and the base station.

Aspects of the present disclosure are to address at least the above-mentioned problems and/or disadvantages and to provide at least the advantages described below. Accordingly, an aspect of the present disclosure is to provide an apparatus and a method for controlling uplink transmission timing between an electronic device and a base station in an IoT environment.

In accordance with an aspect of the present disclosure, an electronic device supporting a low power wide area network (LPWAN) may include a communication circuit to make communication with a base station, a processor electrically connected with the communication circuit, and a memory electrically connected with the processor. The memory may include instructions that, when executed, cause the processor to establish a radio link with the base station by using the communication circuit, to transmit, to the base station, a first message requesting random access by using the communication circuit, to receive a second message replying to the first message from the base station by using the communication circuit, when a timer is running for uplink transmission timing, and to update an existing timing advance value for the uplink transmission timing, based on a timing advance value included in the second message.

In accordance with another aspect of the present disclosure, an electronic device may include a communication circuit, a processor electrically connected with the communication circuit, and a memory electrically connected with the processor and storing instructions. The memory may include instructions that, when executed, cause the processor to establish a radio link with the base station, to receive, from the base station, a message including timing advance information used for performing transmission timing advance for data to the base station, to determine whether a timer for the timing advance is running, to determine whether the electronic device is using an LPWAN when the timer is running, and to update an existing timing advance value for the timing advance based on the timing advance information contained in the message when the electronic device is using the LPWAN.

In accordance with another aspect of the present disclosure, a method of an electronic device includes establishing a radio link with the base station, transmitting, to the base station, a first message requesting random access, receiving a second message replying to the first message from the base station, when a timer is running for uplink transmission timing, and updating an existing timing advance value for the uplink transmission timing, based on a timing advance value included in the second message.

According to various embodiments disclosed in the present disclosure, an electronic device, such as an IoT terminal, supporting a narrower frequency bandwidth may correct transmission timing by applying the timing advance value received from the base station under a pre-determined condition.

According to various embodiments disclosed in the present disclosure, an electronic device supporting IoT may increase its signal transmission/reception rate and prevent network resources from being wasted. This may be accomplished by correcting transmission timing based on the timing advance value received from the base station.

In addition, various other aspects of the present disclosure may be directly or indirectly understood by one of skill in the art in light of the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

In the following description made with respect to the accompanying drawings, similar components will be assigned with similar reference numerals.

DETAILED DESCRIPTION

Hereinafter, various embodiments of the present disclosure may be described with reference to accompanying drawings. Accordingly, those of ordinary skill in the art will recognize that various modifications, equivalents, and/or alternatives on the various embodiments described herein can be made without departing from the scope and spirit of the present disclosure.

Figure 1:
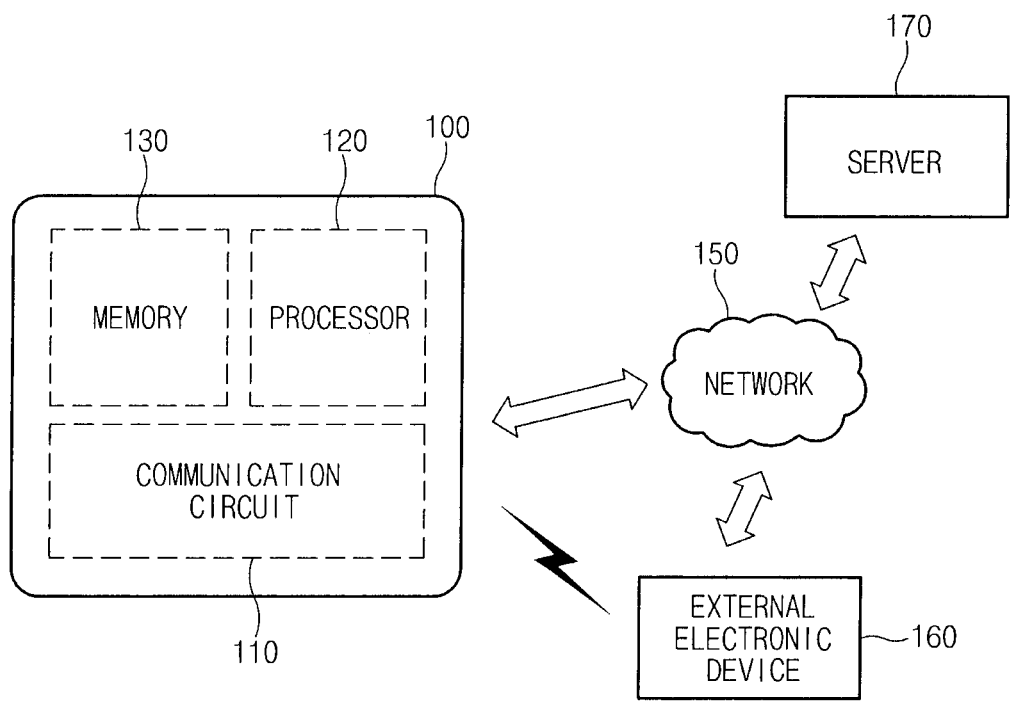
FIG. 1 is a block diagram illustrating a network environment supporting IoT according to an embodiment.

FIG. 1 is a block diagram illustrating a network environment supporting IoT according to an embodiment. Each component depicted herein may be one entity or may be a set of multiple entities.

Referring to FIG. 1, an electronic device 100 and an external electronic device 160 may be referred to as user devices. The electronic device 100 and the external electronic device 160 may also be referred to as terminals, user equipment (UE), mobile stations, subscriber stations, remote terminals, wireless terminals, bandwidth reduced low complexity (BL) UE or coverage enhancement (CE) UE, or another term having the same technical meaning as those of the above components.

According to an embodiment, a network 150 may include one or more entities communicating with the electronic device 100 through one or more wired/wireless channels. For example, the network 150 may include at least one of a base station (e.g., an access point (AP), an eNodeB (eNB), a $5^{th}$ generation node (5G node), a wireless point, a transmission/reception point (TRP), a $5^{th}$ generation NodeB (5GNB) or another term having the same technical meaning as that of the above component), a mobility management entity (MME), a gateway (GW), a home subscriber server (HSS), and a service capability exposure function (SCEF).

According to an embodiment, a server 170 may provide a service to the electronic device 100 and/or the external electronic device 160 through the network 150. The server 170 may be referred to as an application server (AS), a machine type communication (MTC) server, or a machine to machine (M2M) server.

According to an embodiment, the electronic device 100 may include a communication circuit 110, a processor 120, and a memory 130. The communication circuit 110 provides an interface allowing the electronic device 100 to communicate with various different entities (e.g., base stations included in the network 150). The communication circuit 110 converts a bit string to be transmitted to another entity into a physical signal. The communication circuit 110 also converts a physical signal received from the other entity into a bit string that can be processed by the processor 120. As such, the communication circuit 110 may transmit and receive signals. Accordingly, the communication circuit 110 may be referred to as a "transmitter," "receiver," or "transceiver." The memory 130 may store data, such as an operating system, application programs, and/or setting information, for the operation of the electronic device 100. The memory 130 may be implemented with a volatile memory, a non-volatile memory, or the combination of the volatile memory and the non-volatile memory. The memory 130 provides stored data in response to the request of the processor 120. The processor 120 may control the overall operation of the electronic device 100. For example, the processor 120 may transmit uplink data through the communication circuit 110 or may receive downlink data from the network 150. For another example, the processor 120 may store at least a portion of the received downlink data in the memory 130 or may read the at least a portion of the received downlink data out of the memory 130. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the electronic device 100 (specifically the communication circuit 110) may support an IoT network. The IoT network may include a low power wide area network. For example, the communication circuit 110 may transceive data with the network 150 through a pre-determined frequency band. The pre-determined frequency band may be a portion of a frequency band used in a cellular network other than the IoT network (e.g., long term evolution (LTE), universal mobile telecommunication system (UMTS), or global system for mobile communications (GSM) (hereinafter, referred to as "In-Band"). Also, the pre-determined frequency band may include a guard band used in a cellular network other than the IoT network, or may be a dedicated frequency band of the other cellular network (hereafter, referred to as "standalone"). For another example, to save costs and save battery power consumption, the communication circuit 110 may communicate with the network 150 through a limited bandwidth. The limited bandwidth may be narrower than bandwidth typically used in a cellular network and may be, for example, 20 MHz, 1.4 MHz, or 180 KHz. The IoT network may include an LTE-M network and a narrow band IoT (NB IoT) based on standard specifications regulated by 3rd Generation Partnership Project (3GPP).

Since the base station included in the network 150 receives uplink data from each of the plurality of electronic devices, the uplink data from each electronic device may be transmitted at pre-determined times (or uplink transmission timing) to prevent interference between the various signals. In other words, the uplink data transmitted from the electronic devices has to be temporarily aligned. Since distances between the base station and various electronic devices are different, the base station may allocate a timing advance value for uplink transmission timing to each electronic device based on the distances such that the uplink data transmitted from each electronic device is aligned. In various embodiments disclosed in the present disclosure, a series of procedures for controlling the uplink transmission timing between an electronic device and the base station is disclosed. Such procedure may be referred to as a timing advance (TA) procedure.

Figure 2A:
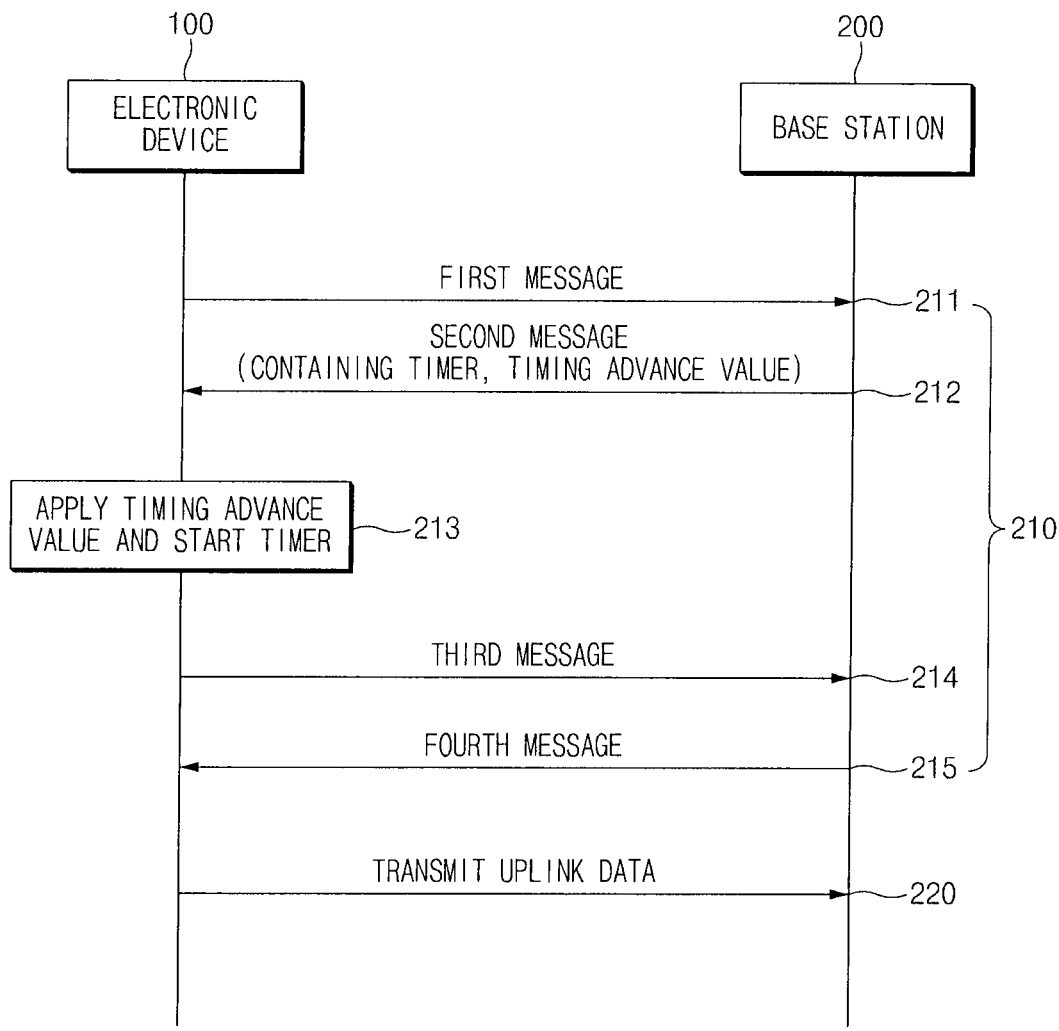
FIG. 2A is a signal flowchart illustrating a timer value for uplink transmission timing that is received in a wireless communication system, according to an embodiment.
Figure 2B:
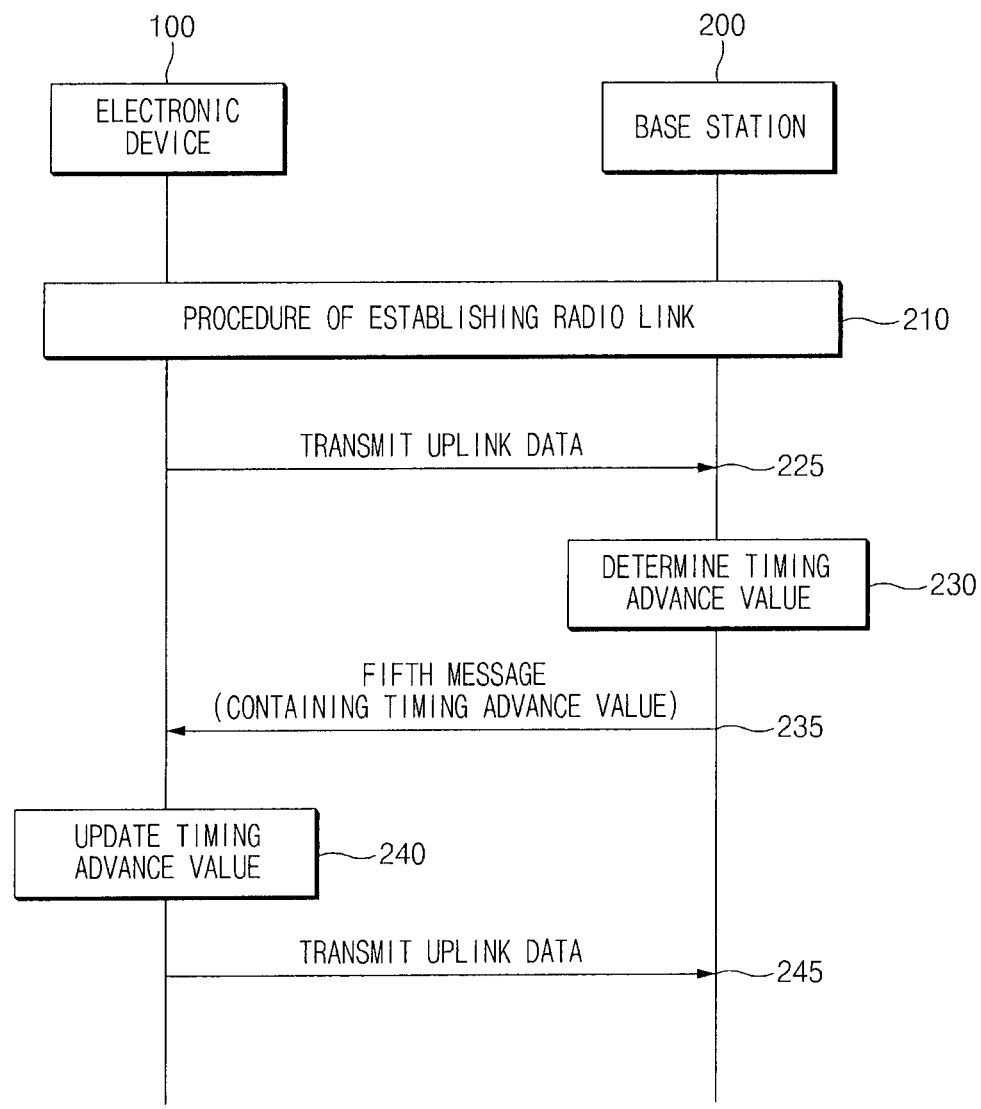
FIG. 2B is a signal flowchart illustrating a timing advance value for uplink transmission timing that is received in a wireless communication system, according to an embodiment.

FIGS. 2A and 2B are signal flowcharts illustrating timing advance values for uplink transmission timing that are received in a wireless communication system. In the following description made with reference to FIGS. 2A to 2B, it is assumed that the electronic device 100 supports another cellular network as well as the IoT network.

According to an embodiment, the electronic device 100 may receive, from a base station 200, a message including a timing advance value via a random access procedure. According to various embodiments disclosed in the present disclosure, the random access procedure may be a procedure to establish a radio link between the electronic device and the base station. Referring to FIG. 2A, procedure 210 (operation 211 to operation 215) is the random access procedure that includes a series of operations for establishing a radio link between the electronic device 100 and the base station 200.

In operation 211, the electronic device 100 may transmit, to the base station 200, a first message requesting random access. The first message may include a physical random access channel (PRACH) preamble.

In operation 212, the base station 200 may transmit, to the electronic device 100, a second message in response to the first message. According to an embodiment, the second message may include a PRACH response message or a random access response (RAR) message. The second message may include a timing advance value for uplink transmission timing between the electronic device 100 and the base station 200 and the timing advance value may be determined by the base station 200. For example, information including the timing advance value may be referred to as a timing alignment command (TAC). The second message may include a timer value and the timer may be referred to as a "timeAlignmentTimer."

In operation 213, the electronic device 100 may apply the timing advance value included in the second message to the uplink transmission timing. The electronic device 100 may advance the uplink transmission timing or may delay the uplink transmission timing based on the applied timing advance value. The electronic device 100 may start the timer (e.g., timeAlignmentTimer) included in the second message.

In operation 214, the electronic device 100 may transmit, to the base station 200, a third message requesting to establish the radio link. The radio link may be referred to as a radio resource control (RRC). The third message may include an RRC connection request. According to an embodiment, the electronic device 100 may adjust the transmission timing of the third message by applying the timing advance value included in the second message.

In operation 215, the base station 200 may transmit a fourth message in response to the third message. The third message may include an RRC connection setup.

In operation 220, the electronic device 100 may transmit uplink data to the base station 200 through the radio link established through procedure 210. The uplink data may include, for example, information regarding time resource, frequency resource, or various identifiers. According to an embodiment, the electronic device 100 may transmit the uplink data by applying the timing advance value included in the second message.

According to an embodiment, as shown in FIG. 2B, the electronic device 100 may receive a message including a timing advance value from the base station 200 after the radio link is established. If the distance between the electronic device 100 and the base station 200 is changed after the radio link is established, the uplink transmission timing would need to be updated.

Referring to FIG. 2B, after the radio link is established in operation 210, the electronic device 100 may transmit uplink data in operation 225, which may include sounding reference signal (SRS), physical uplink shared channel (PUSCH), physical uplink control channel (PUCCH), etc.

In operation 230, the base station 200 may determine a timing advance value to be applied to the electronic device 100 based on the intensity or the arrival time of the signal used to transmit the uplink data.

In operation 235, the base station 200 may transmit, to the electronic device 100, a fifth message including the determined timing advance value. For example, the message transmitted in operation 235 may be referred to as a medium access control (MAC) control element (CE) included in a header of an MAC layer connected between the electronic device 100 and the base station 200.

In operation 240, the electronic device 100 may update the previously-applied timing advance value based on the determined timing advance value included in the fifth message. In operation 245, the electronic device 100 may transmit uplink data to the base station 200 based on the updated timing advance value.

According to the standard specification of the 3GPP, resources used for data transmission may be classified into time resource and frequency resource. The unit of time resource may be referred to as a symbol (e.g., 0.5 ms per symbol) and the unit of frequency resource may be referred to as a subcarrier (e.g., 15 kHz per subcarrier). A resource unit including one symbol and one subcarrier may be referred to as a resource element (RE) and a resource unit including a plurality of REs may be referred to as a resource block (RB). According to various embodiments disclosed in the present disclosure, a scheme in which data is transmitted through one subcarrier may be referred to as a single tone scheme, and a scheme in which data is transmitted through a plurality of subcarriers may be referred to as a multi-tone scheme.

When the electronic device 100 supports an IoT network, since a bandwidth allocated to the electronic device 100 is narrower than that of another cellular network, the electronic device 100 has to transmit uplink data by using a smaller number of subcarriers. For example, the electronic device 100 may transmit the uplink data in the single tone scheme or may transmit the uplink data in the multi-tone scheme using a plurality of subcarriers (e.g., three, six, or 12 subcarriers). However, because bandwidth is limited, when the electronic device 100 transmits uplink data in the multi-tone scheme, a smaller number of subcarriers is used. In this case, the base station 200 may not calculate a timing advance value of the electronic device 100 by using the received uplink data. Accordingly, the base station 200 may not transmit, to the electronic device 100, a timing advance value through a MAC CE illustrated in FIG. 2B, but may transmit the timing advance value only through the second message (random access response message) illustrated in FIG. 2A.

Regarding uplink transmission timing of the cellular network that is not the IoT network, the standard specification of the 3GPP restricts the timing advance value so that any timing advance value transmitted through a message for random access is applicable to only the case where a timer (e.g., the timeAlignmentTimer defined by the 3GPP) is not run. As described above, the electronic device 100 connected with the IoT network may receive a timing advance value only through a message for random access (e.g., the second message). When the message for the random access is received during the running of a timer in the electronic device 100, the electronic device 100 may ignore (e.g., does not apply) the timing advance value included in the message according to the standard specification of the 3GPP. In this case, since the electronic device 100 may not apply a new timing advance value, the electronic device 100 may transmit, to the base station 200, uplink data in the state where transmission timing is not corrected.

Figure 3:
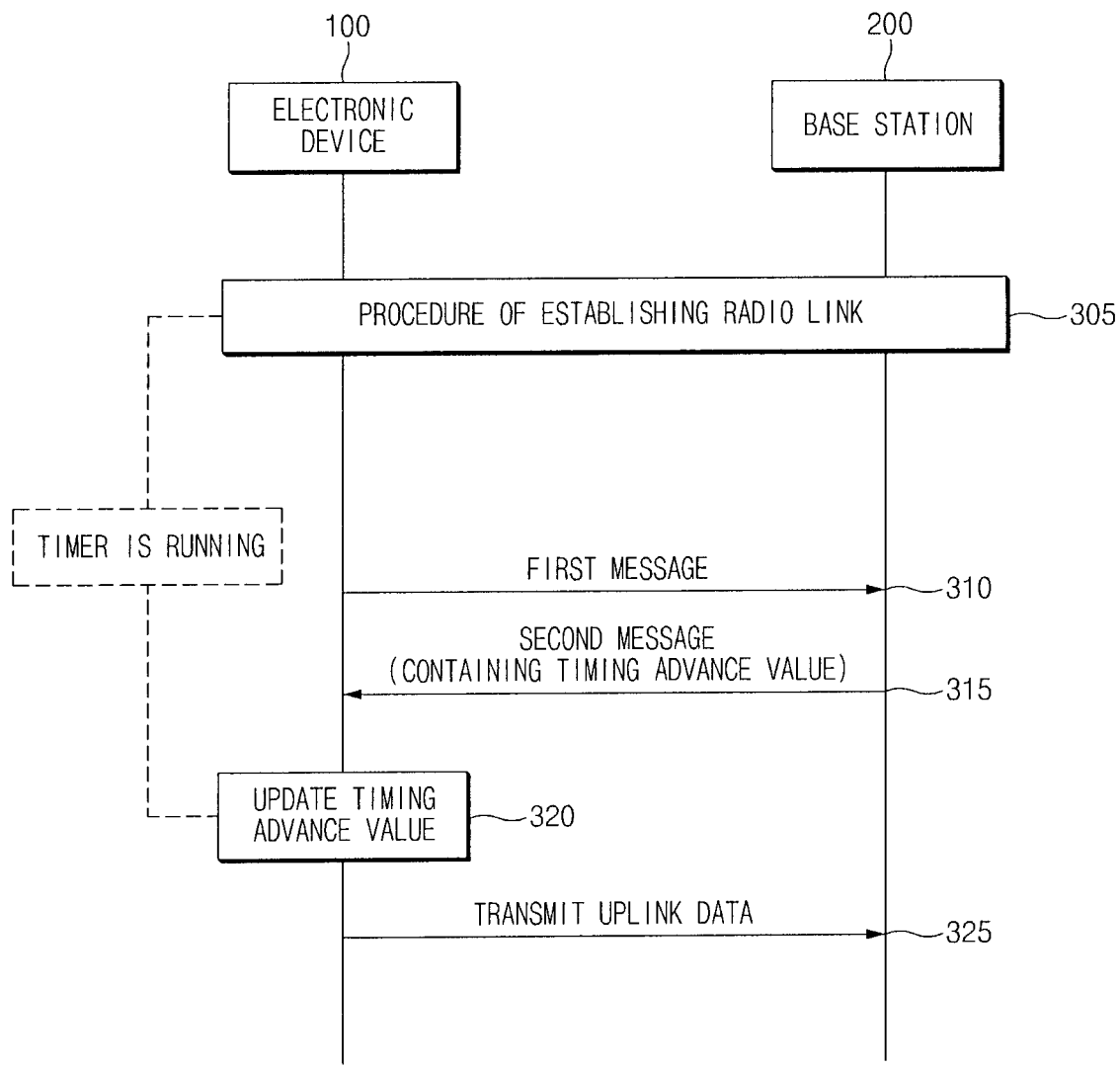
FIG. 3 is a signal flowchart illustrating uplink transmission timing of an electronic device in an IoT environment, according to an embodiment.

FIG. 3 is a signal flowchart illustrating uplink transmission timing of the electronic device 100 in an IoT environment, according to an embodiment. In FIG. 3, it is assumed that the electronic device 100 is connected with an IoT network.

Referring to FIG. 3, in operation 305, the electronic device 100 may perform a procedure of establishing a radio link with the base station 200. The procedure of establishing the radio link may include operation 211 to operation 215 illustrated in FIG. 2A. For example, the electronic device 100 may receive a timing advance value (hereinafter, referred to as "first timing advance value") and a timer value from the base station 200 in operation 305. The electronic device 100 may apply the first timing advance value to uplink transmission timing. For example, the electronic device 100 may transmit uplink data earlier than or later than the original timing by applying the timing advance value. The electronic device 100 may start the received timer so that the timer is running at the electronic device 100.

In operation 310, the electronic device 100 may transmit, to the base station 200, a first message requesting random access. The first message may include, for example, a PRACH preamble or a random access preamble.

In operation 315, the electronic device 100 may receive, from the base station 200, a second message replying to the first message while the timer is running at the electronic device 100. According to an embodiment, the second message may be referred to as an RAR message. For example, the second message may include another timing advance value (hereinafter, referred to as "second timing advance value") that may be the same as or different from the first timing advance value. For example, after the electronic device 100 receives the first timing advance value, if the electronic device 100 moves farther away from the base station 200, the second timing advance value may be determined by the base station 200 to be greater than the first timing advance value. Conversely, and if the electronic device 100 moves closer to the base station 200, the second timing advance value may be determined by the base station 200 to be less than the first timing advance value.

In operation 320, the electronic device 100 may update its timing advance value applied to uplink transmission timing to the second timing advance value. In operation 325, the electronic device 100 may transmit uplink data to the base station 200 based on the second timing advance value.

Thus, the electronic device 100 applies a timing advance value included in an RAR message, which is received while the timer is running, to uplink transmission timing. Accordingly, even if the electronic device 100 moves under the IoT environment, the uplink transmission timing may be corrected.

The type of the IoT network may be varied depending on bandwidth. For example, one particular IoT network may support a bandwidth less than 1 MHz, and another network may support a bandwidth equal to or greater than 1 MHz.

Figure 4:
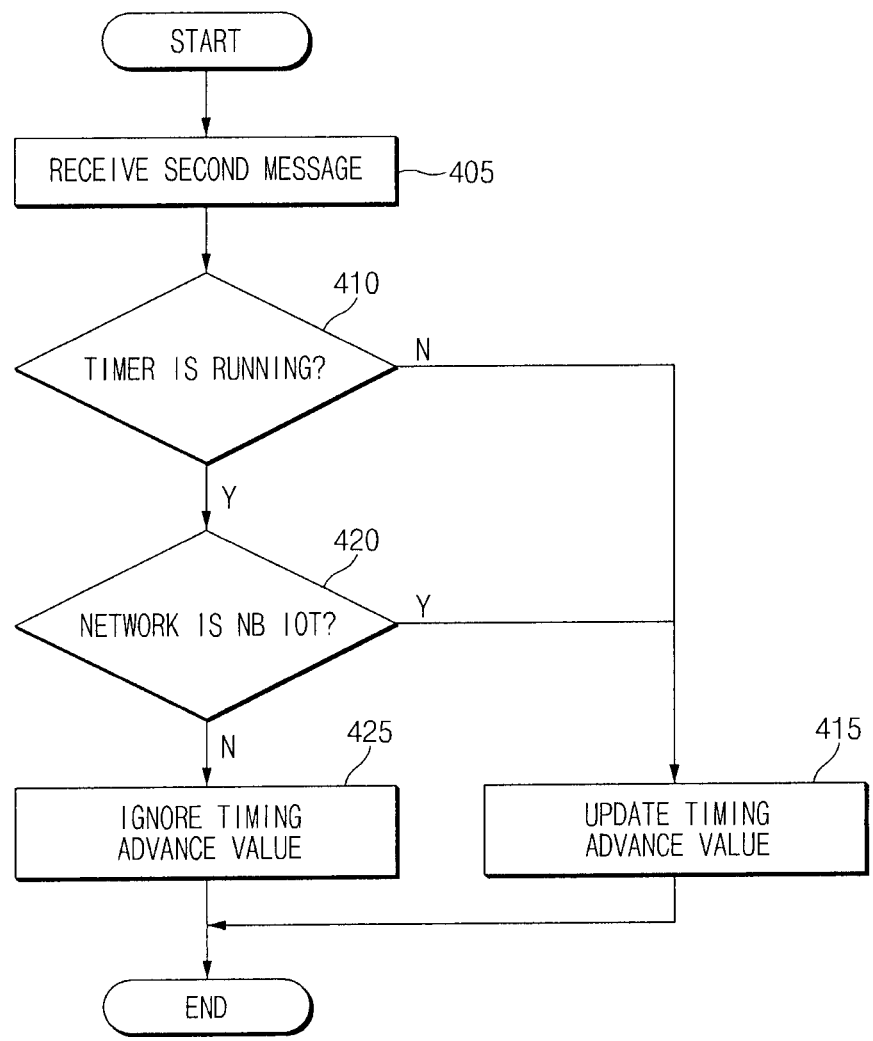
FIG. 4 is a flowchart illustrating the operation of the electronic device to apply a timing advance value based on a network environment, according to an embodiment.

FIG. 4 is a flowchart illustrating the operation of an electronic device 100 to apply a timing advance value based on a network environment, according to an embodiment. In FIG. 4, it is assumed that the communication circuit 110 of the electronic device 100 supports various different networks having various bandwidths. The following operations may be implemented by the electronic device 100 or may be implemented by another component (e.g., the processor 120 or the communication circuit 110) included in the electronic device 100.

Referring to FIG. 4, in operation 405, the electronic device 100 may receive a second message including a second timing advance value. According to an embodiment, the second message may be referred to as an RAR message.

In operation 410, the electronic device 100 may determine whether a timer (e.g., timeAlignmentTimer) is running. If the timer is not running, the electronic device 100 may update its current timing advance value to be the second timing advance value in operation 415. If the timer is running, the electronic device 100 may proceed to operation 420.

In operation 420, the electronic device 100 may determine whether a network connected with the electronic device 100 is a narrow band IoT (NB IoT) network. According to various embodiments disclosed in the present disclosure, the narrow band IoT network may be referred to as a network having a bandwidth less than 1 MHz. If the network connected with the electronic device 100 is an NB IoT network, the electronic device 100 may update the timing advance value to the second timing advance value in operation 415. If the network connected with the electronic device 100 is not an NB IoT network, since the electronic device 100 may be given a timer through another message (e.g., a MAC CE)

instead of the RAR message, the electronic device 100 may ignore the second timing advance value in operation 425.

Figure 5:
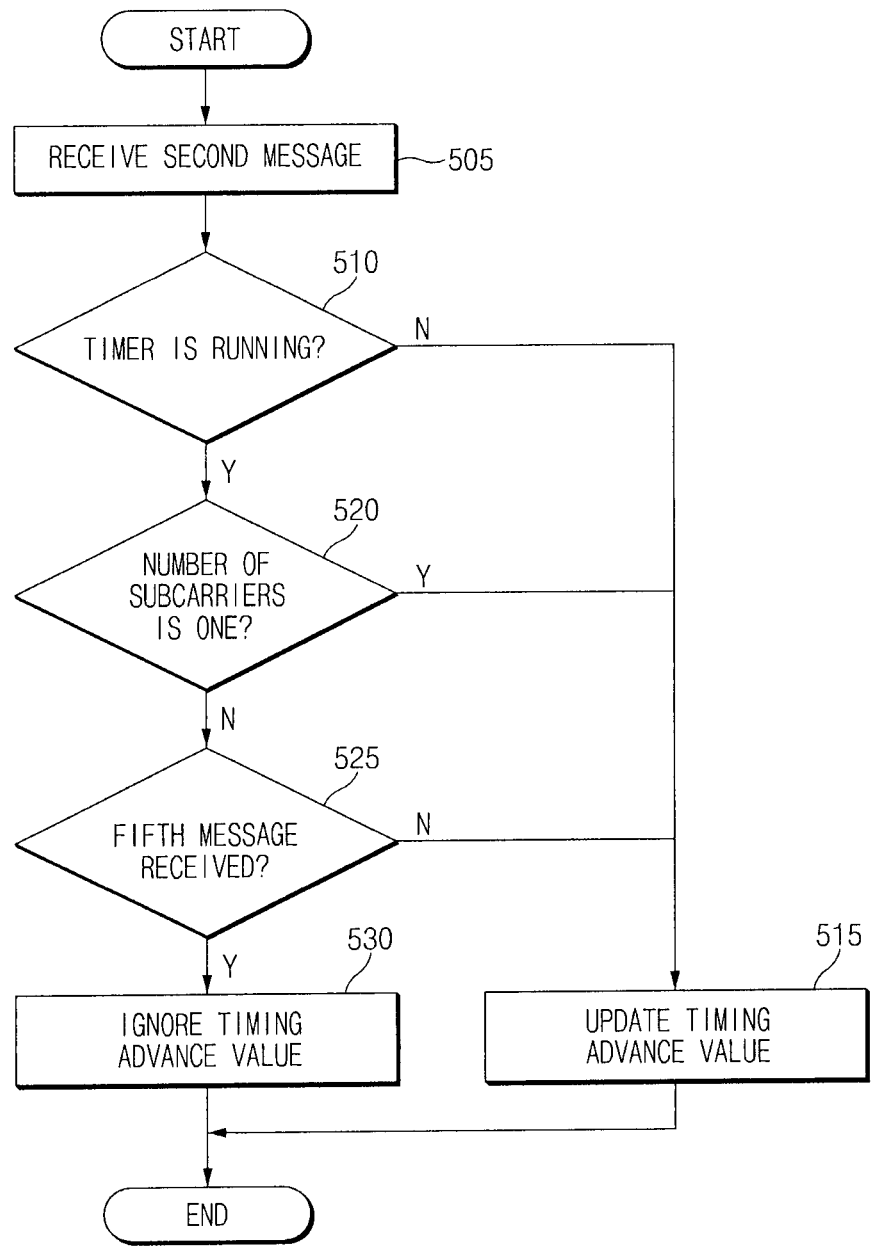
FIG. 5 is a flowchart illustrating the operation of the electronic device to apply a timing advance value based on the number of subcarriers, according to an embodiment.

FIG. 5 is a flowchart illustrating the operation of the electronic device 100 to apply a timing advance value based on the number of subcarriers, according to an embodiment. The following operations may be implemented by the electronic device 100 or may be implemented by another component (e.g., the processor 120 or the communication circuit 110) included in the electronic device 100

Referring to FIG. 5, the electronic device 100 may receive a second message including a second timing advance value in operation 505 and may determine whether a timer (e.g., timeAlignmentTimer) is running in operation 510. If the timer is not running, the electronic device 100 may update its timing advance value to the second timing advance value contained in the second message in operation 515. If the timer is running, the electronic device 100 may proceed to operation 520.

In operation 520, the electronic device 100 may determine whether the number of subcarriers used for uplink transmission is one. In other words, the electronic device 100 may determine whether the single tone scheme is used for uplink transmission. If the number of the subcarriers is one, since the electronic device 100 cannot receive another message including a timer, the electronic device 100 may update the timing advance value to the second timing advance value in operation 515. If the number of subcarriers is two or more (that is, the uplink transmission scheme is the multi-ton scheme), the timing advance value may be updated by the base station 200 and transmitted in a fifth message, as shown in FIG. 2B. Accordingly, the electronic device 100 may perform operation 525.

In operation 525, the electronic device 100 may determine whether the fifth message including another timing advance value (hereinafter, referred to as "third timing advance value") is received. According to an embodiment, the fifth message may be an MAC CE. For example, the base station 200 may calculate the third timing advance value based on the intensity of a uplink signal transmitted from the electronic device 100 in the multi-tone scheme and may transmit the fifth message including the third timing advance value. If the fifth message is not received within a pre-determined threshold time period (e.g., when the base station 200 does not calculate the third timing advance value), the electronic device 100 may update its timing advance value to the second timing advance value in operation 515. If the fifth message is received, since the electronic device 100 may apply the third timing advance value to the uplink transmission, the electronic device 100 may ignore the second timing advance value in operation 530.

Figure 6:
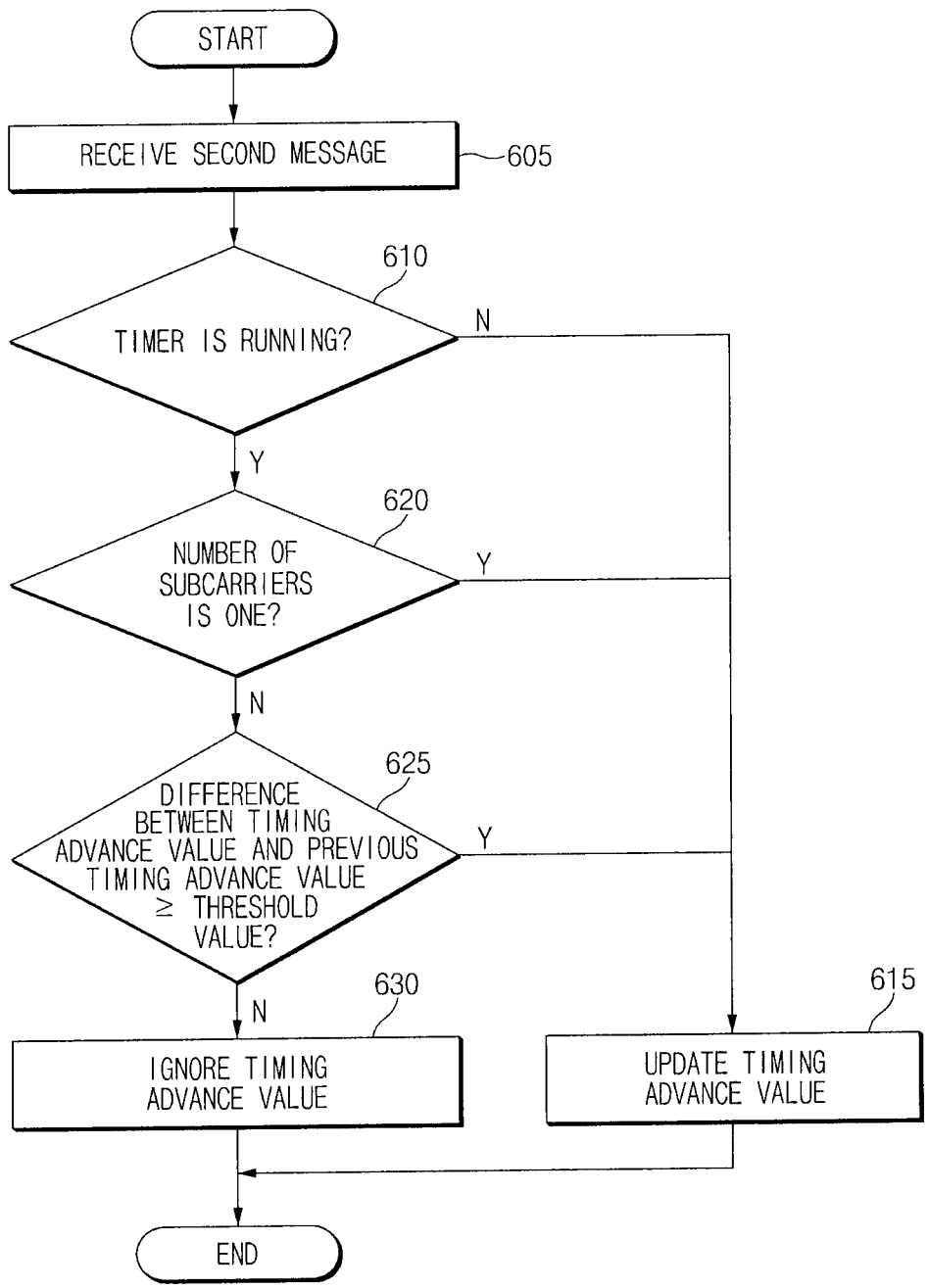
FIG. 6 is a flowchart illustrating the operation of the electronic device to apply a timing advance value based on the number of subcarriers and the difference between timing advance values, according to an embodiment.

FIG. 6 is a flowchart illustrating the operation of the electronic device to apply a timing advance value based on the number of subcarriers and the difference between timing advance values, according to an embodiment. The following operations may be implemented by the electronic device 100 or may be implemented by another component (e.g., the processor 120 or the communication circuit 110) included in the electronic device 100

Referring to FIG. 6, the electronic device 100 may receive a second message in operation 605 and may determine whether a timer (e.g., timeAlignmentTimer) is running in operation 610. If the timer is not running, the electronic device 100 may update its timing advance value to the second timing advance value contained in the second message in operation 615. If the timer is running, the electronic device 100 may proceed to operation 620.

In operation 620, the electronic device 100 may determine whether the number of subcarriers used for uplink transmission is one, and may update the timing advance value to the second timing advance value in operation 615 if the number of subcarriers is one. If the number of subcarriers is plural, the electronic device 100 may perform operation 625.

In operation 625, the electronic device 100 may determine whether the difference between the first timing advance value (e.g. the original timing advance value) and the second timing advance value contained in the second message is equal to or greater than a pre-determined threshold value. If the difference between the first timing advance value and the second timing advance value is equal to or greater than the pre-determined threshold value, the uplink transmission timing may need to be corrected. Accordingly, the electronic device 100 may update its timing advance value to the second timing advance value in operation 615. If the difference between the first timing advance value and the second timing advance value is less than the pre-determined threshold value, the uplink transmission timing may need not to be corrected. Accordingly, the electronic device 100 may ignore the second timing advance value in operation 630.

Figure 7:
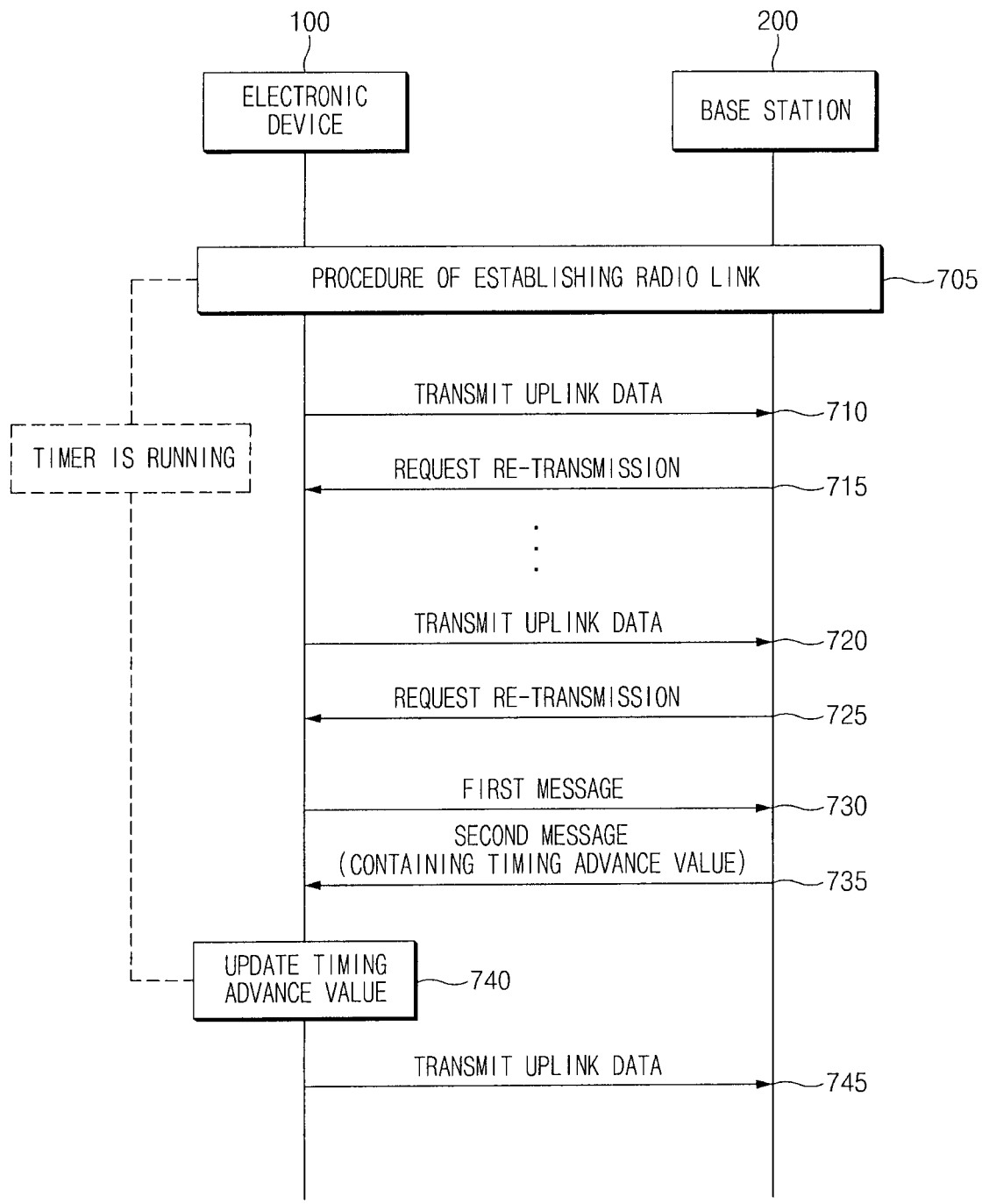
FIG. 7 is a signal flowchart illustrating uplink transmission timing of an electronic device that is controlled based on the number of re-transmission times in an IoT environment, according to an embodiment.

FIG. 7 is a signal flowchart illustrating uplink transmission timing of an electronic device that is controlled based on the number of re-transmission times in an IoT environment, according to an embodiment.

Referring to FIG. 7, in operation 705, the electronic device 100 may perform a procedure to establish a radio link with the base station 200. For example, the electronic device 100 may receive a first timing advance value (e.g., Timing Advance) and a timer (e.g., timeAlignmentTimer) value from the base station 200 in operation 705. The electronic device 100 may apply the first timing advance value to the uplink transmission timing and may start the received timer so that the timer is running at by the electronic device 100.

If the electronic device 100 transmits uplink data in operation 710, the electronic device 100 may receive, form the base station 200, a message requesting re-transmission of the uplink data (hereinafter, referred to as "re-transmission requesting message"). For example, the re-transmission requesting message may be transmitted if the uplink data transmission failed due to movement of the electronic device 100 moves. The uplink data transmission may also fail due to changes in the radio link between the electronic device 100 and the base station 200. The re-transmission of the uplink data and the transmission of the re-transmission requesting message may be repeated several times. If the uplink data is re-transmitted (or if the re-transmission requesting message is received), the electronic device 100 may determine whether the number of re-transmission times is a pre-determined maximum re-transmission value.

If the number of re-transmission times is equal to the pre-determined maximum re-transmission value, the electronic device 100 may transmit a message requesting random access so as to receive a new timing advance value. For example, the transmission of uplink data in operation 720 may be the $N^{th}$ time the uplink data has been transmitted. If N is the maximum re-transmission value, and if another re-transmission requesting message is received in operation 725, the electronic device 100 may transmit the first message requesting random access to the base station 200 in operation 730. For example, the first message may be referred to as a random access request message. The electronic device 100 may transmit the first message through a pre-determined channel (e.g., a physical random access channel (PRACH)).

In operation 735, the electronic device 100 may receive a second message including a second timing advance value from the base station 200. The second timing advance value may be the same as or different from the first timing advance value. In operation 740, the electronic device 100 may update the first timing advance value to the second timing advance value. According to an embodiment, the electronic device 100 may then re-start the timer (e.g., a timeAlignmentTimer) while it is currently running. In operation 745, the electronic device 100 may transmit uplink data by applying the second timing advance value to the transmission.

Figure 8:
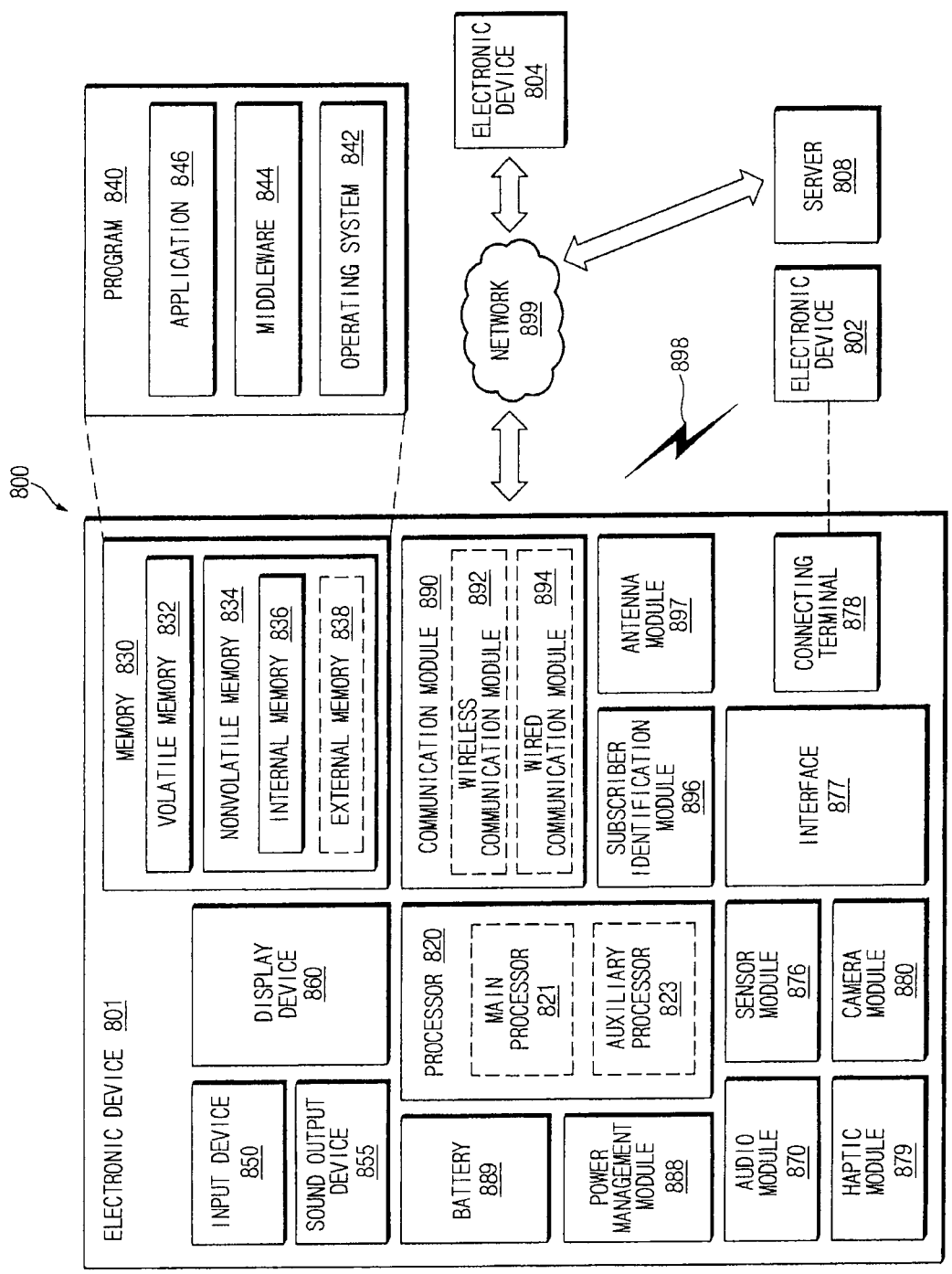
FIG. 8 is a block diagram of the electronic device according to an embodiment.

FIG. 8 is a block diagram of an electronic device according to an embodiment.

FIG. 8 is a block diagram of an electronic device 801 (e.g., the electronic device 100) in a network environment 800 according to an embodiment. Referring to FIG. 8, the electronic device 801 may communicate with an electronic device 802 (e.g., the external electronic device 160) through a first network 898 (e.g., a short-range wireless communication) or may communicate with an electronic device 804 (e.g., the external electronic device 160) or a server 808 (e.g., the server 170) through a second network 899 (e.g., a long-distance wireless communication) (e.g., the network 150) in the network environment 800. According to an embodiment, the electronic device 801 may communicate with the electronic device 804 through the server 808. According to an embodiment, the electronic device 801 may include a processor 820 (e.g., the processor 120), a memory 830 (e.g., the memory 130), an input device 850, a sound output device 855, a display device 860, an audio module 870, a sensor module 876, an interface 877, a haptic module 879, a camera module 880, a power management module 888, a battery 889, a communication module 890 (e.g., the communication circuit 110), a subscriber identification module 896, and an antenna module 897. According to some embodiments, at least one (e.g., the display device 860 or the camera module 880) among components of the electronic device 801 may be omitted or other components may be added to the electronic device 801. According to some embodiments, some components may be integrated and implemented as in the case of the sensor module 876 (e.g., a fingerprint sensor, an iris sensor, or an illuminance sensor) embedded in the display device 860 (e.g., a display).

The processor 820 may operate, for example, software (e.g., a program 840) to control at least one of other components (e.g., a hardware or software component) of the electronic device 801 connected to the processor 820 and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a central processing unit or an application processor) and an auxiliary processor 823 (e.g., a graphic processing device, an image signal processor, a sensor hub processor, or a communication processor), which operates independently from the main processor 821, additionally or alternatively uses less power than the main processor 821, or is specified to a designated function. In this case, the auxiliary processor 823 may operate separately from the main processor 821 or embedded.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the communication processor) may be implemented as a part of another component (e.g., the camera module 880 or the communication module 890) that is functionally related to the auxiliary processor 823. The memory 830 may store a variety of data used by at least one component (e.g., the processor 820 or the sensor module 876) of the electronic device 801, for example, software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving a command or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user and may include, for example, a display, a hologram device, or a projector and a control circuit for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the electronic device 802 (e.g., a speaker or a headphone)) wired or wirelessly connected to the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device (e.g., the electronic device 802). According to an embodiment, the interface 877 may include, for example, an HDMI (high-definition multimedia interface), a USB (universal serial bus) interface, an SD card interface, or an audio interface.

A connecting terminal 878 may include a connector that physically connects the electronic device 801 to the external electronic device (e.g., the electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the electronic device 802, the electronic device 804, or the server 808) and support communication execution through the established communication channel. The communication module 890 may include at least one communication processor operating independently from the processor 820 (e.g., the application processor) and supporting the wired communication or the wireless communication. According to an embodiment, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module) and may communicate with the external electronic device using a corresponding communication module among them through the first network 898 (e.g., the short-range communication network such as a Bluetooth, a WiFi direct, or an IrDA (infrared data association)) or the second network 899 (e.g., the long-distance wireless communication network such as a cellular network, an internet, or a computer network (e.g., LAN or WAN)). The above-mentioned various communication modules 890 may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 801 and the external electronic device 804 through the server 808 connected to the second network 899. Each of the electronic devices 802 and 804 may be the same or different types as or from the electronic device 801. According to an embodiment, all or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

As described above, an electronic device (e.g., the electronic device 100) supporting an LPWAN may include a communication circuit (e.g., the communication circuit 110) to make communication with a base station (e.g., the base station 200), a processor (e.g., the processor 120) electrically connected with the communication circuit, and a memory (e.g., the memory 130) electrically connected with the processor. The memory includes instructions that, when executed, cause the processor to establish a radio link with the base station by using the communication circuit, transmit, to the base station, a first message requesting a random access by using the communication circuit, receive a second message replying to the first message from the base station by using the communication circuit, when a timer is running for uplink transmission timing, and update an existing timing advance value for the uplink transmission timing, based on a timing advance value included in the second message. According to an embodiment, the instructions may cause the processor to re-start a timer in response to reception of the second message.

According to an embodiment, the instructions may cause the processor to ignore the timing advance value included in the second message when the network connected with the electronic device has a bandwidth equal to or greater than 1 MHz, and update the existing timing advance value based on the timing advance value included in the second message when the network connected with the electronic device has a bandwidth less than 1 MHz.

According to an embodiment, the instructions may cause the processor to update the existing timing advance value based on the timing advance value included in the second message, if a number of subcarriers used for uplink transmission is one. In addition, the instructions may cause the processor to determine whether a third message including another timing advance value is received if the number of subcarriers used for the uplink transmission is two or more, and update the existing timing advance value based on the timing advance value included in the second message, when the third message is not received within a pre-determined threshold time period.

According to an embodiment, the instructions may cause the processor to update the existing timing advance value based on the timing advance value included in the second message, when the number of subcarriers used for the uplink transmission is two or more and when a difference between the timing advance value included in the second message and the existing timing advance value is equal to or greater than a pre-determined threshold value.

According to an embodiment, the instructions may cause the processor to transmit an uplink signal using the communication circuit multiple times, and transmit the first message requesting random access to the base station by using the communication circuit, if a number of transmission times of the uplink signal is equal to a pre-determined maximum re-transmission value.

According to an embodiment, an electronic device (e.g., the electronic device 100) may include a communication circuit (e.g., the communication circuit 110), a processor (e.g., the processor 120) electrically connected with the communication circuit, and a memory (e.g., the memory 130) electrically connected with the processor and storing instructions. The memory may include instructions that, when executed, cause the processor to establish a radio link with a base station (e.g., the base station 200), receive, from the base station, a message including timing advance information used for timing advance for data transmission to the base station, determine whether a timer for the timing advance is running, determine whether the electronic device is using an LPWAN when the timer is running, and update an existing timing advance value for the timing advance based on the timing advance information contained in the message when the electronic device is using the LPWAN. According to an embodiment, the radio link may be implemented based at least on Technical Specification (TS) 36.321 regulated by $3^{rd}$ Generation Partnership Project (3GPP). According to an embodiment, the message may include a timing advance command medium access control (MAC) control element (CE). According to an embodiment, the timer may include timeAlignmentTimer. According to an embodiment, the message may include a random access response (RAR) message.

According to an embodiment, the instructions may cause the processor to update the existing timing advance value based on the timing advance information contained in the message without determining whether the electronic device is using the LPWAN, if the timer is not running. According to an embodiment, the instructions may cause the processor to ignore the timing advance information contained in the message when the electronic device is not connected with the LPWAN. According to an embodiment, the LPWAN may include a Narrow Band Internet of Things (NB IoT) network based on specifications regulated by the 3GPP.

According to an embodiment, a method of an electronic device (e.g., the electronic device 100) may include establishing a radio link with a base station, transmitting, to the base station, a first message requesting a random access, receiving a second message replying to the first message from the base station, when a timer is running for uplink transmission timing, and updating an existing timing advance value for the uplink transmission timing, based on a timing advance value included in the second message.

According to an embodiment, the method may further include re-starting a timer in response to receiving the second message. According to an embodiment, the method may further include ignoring the timing advance value included in the second message when a network connected with the electronic device has a bandwidth equal to or greater than 1 MHz, and updating the existing timing advance value based on the timing advance value included in the second message when the network connected with the electronic device has a bandwidth less than 1 MHz.

According to an embodiment, the method may further include updating the existing timing advance value, based on the timing advance value included in the second message, if a number of subcarriers used for uplink transmission is one. According to an embodiment, the method may further include determining whether a third message including another timing advance value is received if the number of subcarriers used for the uplink transmission is two or more, and updating the existing timing advance value based on the timing advance value included in the second message, when the third message is not received within a pre-determined threshold time period.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that use of the various embodiments of the present disclosure and terms used in the embodiments are not intended to limit technologies disclosed in the present disclosure to the particular forms disclosed herein; rather, the present disclosure should be construed to cover various modifications, equivalents, and/or alternatives of embodiments of the present disclosure. As used herein, singular forms of terms may refer to their plural forms as well unless the context clearly indicates otherwise. In the present disclosure disclosed herein, the expressions "A or B," "at least one of A or/and B," "A, B, or C," or "one or more of A, B, or/and C," and the like used herein may include any and all combinations of one or more of the associated listed items. The expressions "a first," "a second," "the first," or "the second," used in herein, may refer to corresponding components without implying an order of importance, and are used merely to distinguish each component from the others without unduly limiting the components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part," and "circuit." The "module" may be an integrated part or may be a subcomponent thereof. The "module" may be an integrated unit for performing one or more functions or a subcomponent thereof. For example, the "module" may include an application-specific integrated circuit (ASIC).

Various embodiments of the present disclosure may be implemented by software (e.g., the program 840) including instruction(s) stored in a machine-readable storage media (e.g., an internal memory 836 or an external memory 838) readable by a machine (e.g., a computer). The machine may be a device that calls the instruction(s) from the machine-readable storage media and operates depending on the called instruction(s) and may include the electronic device (e.g., the electronic device 801). When the instruction(s) is executed by the processor (e.g., the processor 820), the processor may perform function(s) corresponding to the instruction(s) directly or using other components under the control of the processor. The instruction(s) may include code made by a compiler or code executable by an interpreter. The machine-readable storage media may be provided in the form of non-transitory storage media. Here, the term "non-transitory" is a limitation of the medium itself (i.e., tangible, not including a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a program, or other components according to various embodiments of the present disclosure may be executed sequentially, in parallel, repeatedly, or in a heuristic method. Also, at least some operations may be executed in different sequences, omitted, or other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device supporting a low power wide area network (LPWAN), the electronic device comprising:
   a communication circuit configured to communicate with a base station;
   a processor electrically connected with the communication circuit; and
   a memory electrically connected with the processor, wherein the memory includes instructions that, when executed, cause the processor to:
   establish a radio link with the base station by using the communication circuit;
   transmit, to the base station, a first message requesting random access by using the communication circuit;
   receive a second message replying to the first message from the base station by using the communication circuit, when a timer is running for uplink transmission timing; and
   selectively update or ignore, based at least in part on a number of subcarriers used for uplink transmission, wherein selectively update comprises selectively updating an existing timing advance value for the uplink transmission timing when the timer is running for uplink transmission timing, according to a timing advance value included in the second message and wherein ignore comprises ignoring the timing advance value included in the second message, wherein selectively updating or ignoring further comprises:
   when there is one subcarrier, updating the timing advance value; and
   when there is more than one subcarrier, updating the timing advance value when a difference between the existing timing advance value for the uplink transmission and the timing advance value included in the second message exceeds a predetermined threshold.

2. The electronic device of claim 1, wherein the instructions cause the processor to:
   re-start the timer in response to reception of the second message.

3. The electronic device of claim 1, wherein selectively update comprises:
   when the number of subcarriers used for the uplink transmission is two or more, determine whether a third message including another timing advance value is received;
   update the existing timing advance value with the timing advance value included in the second message, when the third message is not received within a pre-determined threshold time period; and
   ignore the timing advance value included in the second message when the third message is received within the pre-determined threshold time period.

4. The electronic device of claim 1, wherein selectively update further comprises:
   when the number of subcarriers used for the uplink transmission is more than one and when the timing advance value is less than the pre-determined threshold, ignore the timing advance value included in the second message.

5. The electronic device of claim 1, wherein the instructions cause the processor to:
   transmit an uplink signal multiple times by using the communication circuit; and
   transmit the first message requesting random access to the base station by using the communication circuit, when a number of transmission times of the uplink signal is equal to a pre-determined maximum re-transmission value.

6. An electronic device supporting a low power wide area network (LPWAN), the electronic device comprising:

a communication circuit configured to communicate with a base station;

a processor electrically connected with the communication circuit; and a memory electrically connected with the processor, wherein the memory includes instructions that, when executed, cause the processor to:

establish a radio link with the base station by using the communication circuit;

transmit, to the base station, a first message requesting random access by using the communication circuit;

receive a second message replying to the first message from the base station by using the communication circuit, when a timer is running for uplink transmission timing; ignore a timing advance value included in the second message when a network connected with the electronic device has bandwidth equal to or greater than 1 MHz; and update an existing timing advance value based on the timing advance value included in the second message when the network connected with the electronic device has bandwidth less than 1 MHz.

7. An electronic device comprising:

a communication circuit;

a processor electrically connected with the communication circuit; and a memory electrically connected with the processor and storing instructions, wherein the memory includes instructions that, when executed, cause the processor to:

establish a radio link with a base station;

receive, from the base station, a message including timing advance information used for timing advance for data transmission to the base station;

update an existing timing advance value for the timing advance based on the timing advance information contained in the message, when a timer for the timing advance is not running or the electronic device is using a low power wide area network (LPWAN); and ignoring the timing advance information contained in the message when the timer is running and the electronic device is not using the LPWAN.

8. The electronic device of claim 7, wherein the radio link is implemented based at least on Technical Specification (TS) 36.321 regulated by $3^{rd}$ Generation Partnership Project (3GPP).

9. The electronic device of claim 8, wherein the message includes:

a timing advance command medium access control (MAC) control element (CE).

10. The electronic device of claim 9, wherein the timer includes timeAlignmentTimer.

11. The electronic device of claim 10, wherein the message includes a random access response (RAR) message.

12. The electronic device of claim 7, wherein the LPWAN includes a Narrow Band Internet of Things (NB IoT) network based on specifications regulated by the 3GPP.

13. A method of an electronic device, the method comprising:

establishing a radio link with a base station;

transmitting, to the base station, a first message requesting random access;

receiving a second message replying to the first message from the base station, when a timer is running for uplink transmission timing; and selectively updating or ignoring, based at least in part on a number of subcarriers used for uplink transmission, wherein selectively updating comprises selectively updating an existing timing advance value for the uplink transmission timing when the timer is running for uplink transmission timing, according to a timing advance value included in the second message and ignoring comprises ignoring the timing advance value included in the second message, wherein selectively updating or ignoring further comprises:

when there is one subcarrier, updating the timing advance value; and when there is more than one subcarrier, updating the existing timing advance value based on the timing advance value included in the second message, when a third message is not received within a pre-determined threshold time period.

14. The method of claim 13, further comprising:

re-starting a timer in response to reception of the second message.

15. The method of claim 13, wherein selectively updating further comprises:

when there is more than one subcarrier, ignoring the timing advance value included in the second message when the third message is received with the pre-determined threshold time period.

16. A method of an electronic device, the method comprising:

establishing a radio link with a base station;

transmitting, to the base station, a first message requesting random access;

receiving a second message replying to the first message from the base station, when a timer is running for uplink transmission timing; ignoring the timing advance value included in the second message when a network connected with the electronic device has bandwidth equal to or greater than 1 MHz; and updating an existing timing advance value based on the timing advance value included in the second message when the network connected with the electronic device has bandwidth less than 1 MHz.

* * * * *